United States Patent
Nemoto et al.

(10) Patent No.: US 9,692,261 B2
(45) Date of Patent: Jun. 27, 2017

(54) ROTATING ELECTRIC MACHINE AND ELECTRICALLY DRIVEN VEHICLE

(71) Applicant: Hitachi Automotive Systems, Ltd., Hitachinaka-shi, Ibaraki (JP)

(72) Inventors: Kanako Nemoto, Tokyo (JP); Hidetoshi Koka, Tokyo (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 129 days.

(21) Appl. No.: 14/413,432

(22) PCT Filed: Jun. 19, 2013

(86) PCT No.: PCT/JP2013/066777
§ 371 (c)(1),
(2) Date: Jan. 8, 2015

(87) PCT Pub. No.: WO2014/013830
PCT Pub. Date: Jan. 23, 2014

(65) Prior Publication Data
US 2015/0295455 A1     Oct. 15, 2015

(30) Foreign Application Priority Data

Jul. 17, 2012   (JP) ................. 2012-158790

(51) Int. Cl.
*H02K 1/16*   (2006.01)
*H02K 21/14*  (2006.01)

(52) U.S. Cl.
CPC .............. *H02K 1/16* (2013.01); *H02K 21/14* (2013.01); *Y02T 10/641* (2013.01)

(58) Field of Classification Search
CPC .......... H02K 1/16; H02K 29/03; H02K 21/14; H02K 2213/03; H02K 23/405; H02K 23/42; Y02T 10/641
(Continued)

(56) References Cited

U.S. PATENT DOCUMENTS

| 6,424,073 | B1 | 7/2002 | Kometani et al. |
| 2009/0195113 | A1* | 8/2009 | Kolomeitsev ............ H02K 1/16 |
| | | | 310/216.091 |
| 2009/0243423 | A1* | 10/2009 | Hattori .................. H02K 1/165 |
| | | | 310/216.092 |

FOREIGN PATENT DOCUMENTS

| JP | 6-113512 A | 4/1994 |
| JP | 2001-25182 A | 1/2001 |

(Continued)

OTHER PUBLICATIONS

International Search Report dated Aug. 27, 2013 with English translation (three (3) pages).

*Primary Examiner* — Michael Andrews
*Assistant Examiner* — Noli Manaloto
(74) *Attorney, Agent, or Firm* — Crowell & Moring LLP

(57) ABSTRACT

Provided is a rotating electric machine including a rotor and stator fitted with various numbers of poles and slots and adapted to reduce vibration/noise of the machine. The rotating electric machine in accordance with an aspect of the present invention includes a stator having an S number of teeth, and a rotor disposed in the stator with a gap intervening between the stator and the rotor. The plurality of teeth in the stator are grouped in units of the number of teeth that is equal to a value "m" or a value "d", the value "m" being obtained by dividing the number of stator slots, S, by the greatest common divisor N of the number of poles, P, and the number of stator slots, S, the value "d" being an aliquot of "m". At least one tooth in each of the tooth groups has a distal end different in shape from distal ends of other teeth belonging to the same tooth group, and the plurality of tooth groups have the same configuration.

5 Claims, 20 Drawing Sheets

(58) Field of Classification Search
USPC ..... 310/216.092, 216.094, 216.091, 216.096
See application file for complete search history.

(56) References Cited

FOREIGN PATENT DOCUMENTS

| | | |
|---|---|---|
| JP | 2001-251823 A | 9/2001 |
| JP | 2007-166710 A | 6/2007 |

* cited by examiner

ROTATING ELECTRIC MACHINE AND ELECTRICALLY DRIVEN VEHICLE

TECHNICAL FIELD

The present invention relates to a rotating electric machine and to an electrically driven vehicle that includes a rotating electric machine mounted thereon.

BACKGROUND ART

The present invention is directed to rotating electric machines used as traction for a hybrid electric vehicle (HEV) or electric vehicle (EV).

Rotating electric machines are mounted in household electrical appliances and office automation machines, and in recent years, they have also come to be mounted on HEVs, EVs, and other electrically driven vehicles.

Rotating electric machines for electrically driven vehicles such as HEVs or EVs, in particular, are required to develop high motive output power. These rotating electric machines for electrically driven vehicles are used in wide rotational speed ranges, so in each of the rotating electric machines, an excitation frequency of an electromagnetic excitation force varies in a wide range and a natural frequency of a structure of the rotating electric machine agrees with the excitation frequency at specific rotational speeds. The occurrence of vibration/noise due to resonance is therefore unavoidable.

The pursuit of a more comfortable vehicle interior environment, on the other hand, is increasing the need for reduction in vibration/noise level, and a number of techniques are developed to reduce the vibration/noise arising from the rotating electric machine main body.

The electromagnetic excitation force that causes the vibration/noise arising from the rotating electric machine main body is applied in three directions, that is, radially, tangentially, and axially. Reducing noise of an audible frequency band, in particular, requires reducing harmonics amplitude of these electromagnetic excitation forces.

Patent Document 1 discloses a rotating electric machine having an "n" number of poles and an "s" number of phases. In-phase teeth each with a coil of the same phase placed in each of two slots, and out-of-phase teeth each with a coil of a different phase placed in each of two slots formed along a rotational axis of a rotor are arranged in a stator core of the rotating electric machine. In this rotating electric machine, when an alternating current is supplied to the "n×s" number of coils, a magnetic circuit is formed across each of the in-phase teeth and the out-of-phase teeth, with a difference being provided in magnetic resistance of each magnetic circuit so that the number of magnetic fluxes passing through the teeth will be substantially equal between the two sets of teeth.

The rotating electric machine described in Patent Document 1 is of Intelligent Power Module (IPM) construction with a rotor of "n" poles, wherein the number of stator core teeth is limited to "2n×s". It is described that such a shape of the stator core reduces an electromagnetic excitation force of 6f (sixth order) and thus reduces electromagnetic noise. In the stator core structure of this rotating electric machine, the number of slots is limited to "2n×s" ("2n" poles by "s" phases), so the rotating electric machine needs further improvement or modification to achieve application to other forms of stator core structures in terms of the number of slots.

PRIOR ART LITERATURE

Patent Documents

Patent Document 1: JP-2007-166710-A

SUMMARY OF THE INVENTION

Problems to be Solved by the Invention

Conventional preventive measures against electromagnetic noise have only been undertaken primarily for torque ripples, and little consideration has been paid to vibration/noise due to the harmonics of a radial electromagnetic excitation force. In addition, a method of changing the shape and pitch of the stator teeth as one of the conventional preventive measures against electromagnetic noise has not been flexibly applicable to various combinations of the number of poles and that of stator teeth (slots).

Means for Solving the Problems

To solve the above problems, a rotating electric machine in accordance with an aspect of the present invention includes a stator having an S number of teeth, and a rotor disposed in the stator with a gap intervening between the stator and the rotor. The plurality of teeth in the stator are grouped in units of the number of teeth that is equal to a value "m" or a value "d", the value "m" being obtained by dividing the number of stator slots, S, by the greatest common divisor N of the number of poles, P, and the number of stator slots, S, the value "d" being an aliquot of "m". At least one tooth in each of the tooth groups has a distal end different in shape from distal ends of other teeth belonging to the same tooth group, and the plurality of tooth groups have the same configuration.

Effects of the Invention

With the present invention, the harmonics amplitude of the radial electromagnetic excitation force particularly influential upon vibration/noise can be reduced without changing a periodic boundary condition, and as a result, the rotating electric machine can be reduced in vibration/noise level.

BRIEF DESCRIPTION OF THE DRAWINGS

FIG. 4(*a*) shows an exemplary shape of teeth which form one stator tooth group (180 degrees in electrical angle) that includes nine teeth each having a distal end of a different shape in the first embodiment and the fifth embodiment.

FIG. 4(b) is a diagram showing an axial shape of the teeth in FIG. 4(a) taking a tooth 5b as an example.

MODE FOR CARRYING OUT THE INVENTION

Figure 1:
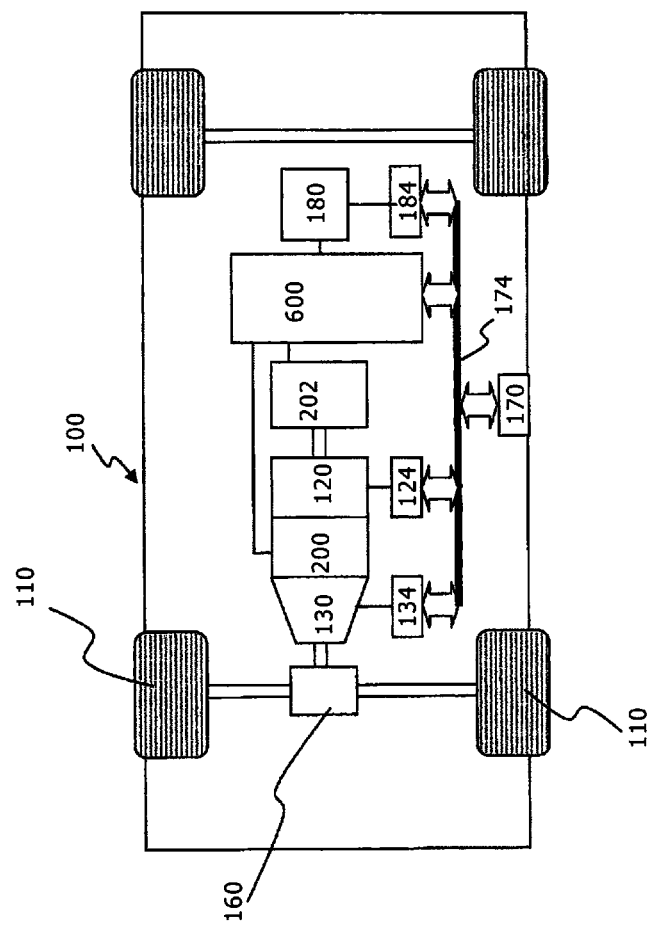
FIG. 1 is a diagram showing schematically a configuration of a hybrid electric automobile which includes rotating electric machines according to an embodiment of the present invention.

FIG. 1 is a diagram showing schematically a configuration of a hybrid electric automobile which includes rotating electric machines according to an embodiment of the present invention. The vehicle 100 is mounted with an engine 120, a first rotating electric machine 200, a second rotating electric machine 202, and a battery 180. When driving force by the rotating electric machines 200, 202 is needed, the battery 180 supplies DC power to a power conversion device (inverter) 600 for driving the rotating electric machines 200, 202, and then the power conversion device 600 converts the DC power into AC power and supplies the AC power to the rotating electric machines 200, 202. For regenerative traveling, on the other hand, the rotating electric machines 200, 202 generate AC power according to particular kinetic energy of the vehicle and supply the AC power to the power conversion device 600. The power conversion device 600 then converts the AC power into DC power and supplies the DC power to the battery 180. The vehicle also includes a battery, albeit not shown, that supplies low-voltage power (e.g., 14-volt power), and this battery supplies the DC power of a constant voltage to a control circuit described later herein.

Rotational torque by the engine 120 and the rotating electric machines 200, 202 is transmitted to front wheels 110 via a transmission 130 and a differential gear 132. The transmission 130 is controlled by a transmission control unit 134, and the engine 120 is controlled by an engine control unit 124. The battery 180 is controlled by a battery control unit 184. The transmission control unit 134, the engine control unit 124, the battery control unit 184, the power conversion device 600, and an integrated control system 170 are connected via a communications line 174.

The integrated control system 170 receives information indicating respective states of the transmission control unit 134, the engine control unit 124, the power conversion device 600, and the battery control unit 184, from these control units lower than the integrated control system 170 in terms of management level. The integrated control system 170 computes control commands for the control units, based on the received information. The computed control commands are transmitted to the respective control units via the communications line 174.

The high-voltage battery 180, which includes lithium-ion cells, nickel-hydrogen cells, or other secondary cells, outputs DC power of a high voltage ranging from 250 volts to 600 volts or higher. The battery control unit 184 outputs information on a discharge status of the battery 180 and a state of the unit cells constituting the battery 180, to the integrated control system 170 via the communications line 174.

Upon determining from the received information from the battery control unit 184 that the battery 180 needs charging, the integrated control system 170 instructs the power conversion device 600 to start operating to generate electricity. In addition, the integrated control system 170 mainly manages the output torque of the engine 120 and that of the rotating electric machines 200, 202, computes an overall torque value of, and a torque distribution ratio between, the output torque of the engine 120 and that of the rotating electric machines 200, 202, and transmits the control commands based on results of the computations, to the transmission control unit 134, the engine control unit 124, and the power conversion device 600. In accordance with a torque command from the integrated control system 170, the power conversion device 600 controls the rotating electric machines 200, 202 to generate a torque output exactly as specified in the command, or to generate a corresponding amount of electricity.

The power conversion device 600 contains inverter-constituting power semiconductors to operate the rotating electric machines 200, 202. The power conversion device 600 controls switching operation of the power semiconductors under a command from the integrated control system 170. The switching operation of the power semiconductors causes at least one of the rotating electric machines 200, 202 to operate as an electric motor or a generator.

To operate the rotating electric machines 200, 202 as electric motors, the DC power from the high-voltage battery 180 is supplied to DC terminals of the inverter section of the power conversion device 600. By controlling the switching operation of the power semiconductors, the power conversion device 600 converts the supplied DC power into three-phase AC power and supplies the AC power to the rotating electric machine 200, 202. Conversely, to operate the rotating electric machines 200, 202 as generators, a rotational torque applied from outside will drive a rotor of the rotating electric machine 200, 202 to rotate, thus generating three-phase AC power across a stator winding of the rotating electric machine 200, 202. The power conversion device 600 will convert the generated three-phase AC power into DC power, which will then be supplied to the high-voltage battery 180 to charge this battery.

The rotating electric machines 200 and 202 are each controlled independently. For example, when the rotating electric machine 200 is operated as an electric motor, the rotating electric machine 202 can be operated as either a second electric motor or a generator. The operation of the rotating electric machine can also be stopped. Obviously the opposite of this is possible as well. The integrated control system 170 determines in what mode the rotating electric machines 200 and 202 are to be operated, and correspondingly commands the power conversion device 600. Depending on this command, the power conversion device 600 enters one of a motor operation mode, a generator operation mode, and an operation halt mode.

Figure 2:
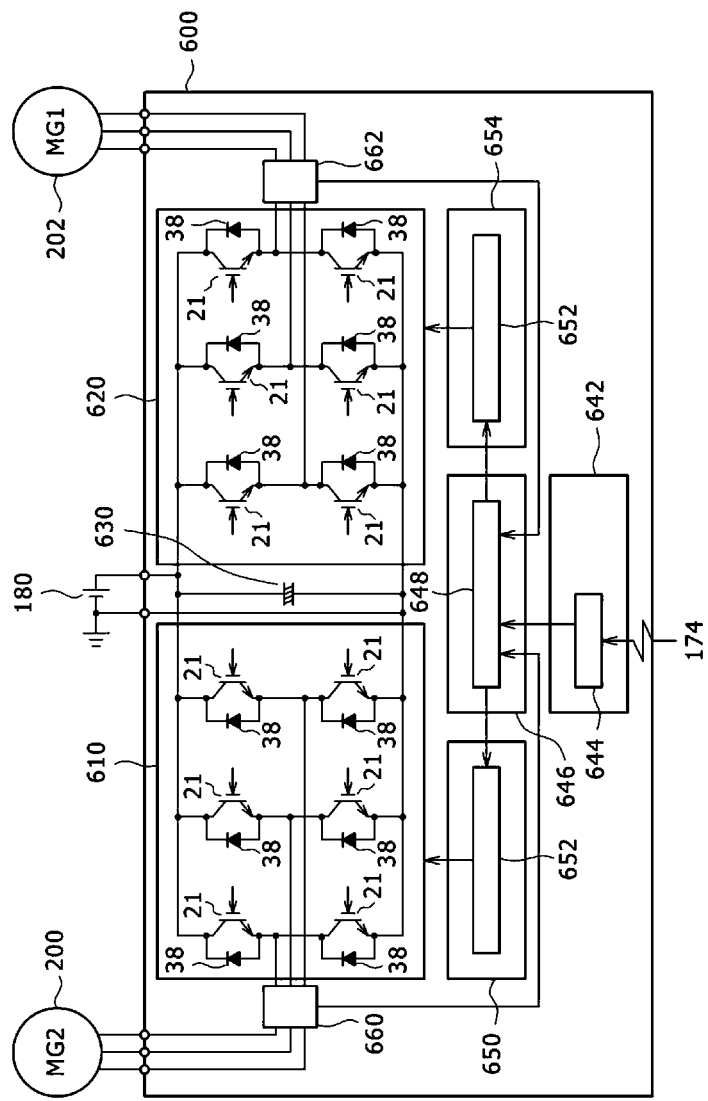
FIG. 2 is a circuit diagram of a power conversion device 600.

FIG. 2 conceptually shows a circuit diagram of the power conversion device 600. The power conversion device 600 contains a first inverter device for the rotating electric machine 200, and a second inverter device for the rotating electric machine 202. The first inverter device includes a power module 610, a first driving circuit 652 that controls switching operation of power semiconductors 21 within the power module 610, and a current sensor 660 that senses a current of the rotating electric machine 200. The driving circuit 652 is formed on a driving circuit board 650. The second inverter device includes a power module 620, a second driving circuit 656 that controls switching operation of power semiconductors 21 within the power module 620, and a current sensor 662 that senses a current of the rotating electric machine 202. The driving circuit 656 is disposed on a driving circuit board 654. A control circuit 648 disposed on a control circuit board 646, a capacitor module 630, and a send/receive circuit 644 formed on a connector board 642 are used in common between the first inverter device and the second inverter device.

The power modules 610, 620 operate by driver signals that are output from the respective driving circuits 652, 656. The power modules 610, 620 convert the DC power that has been supplied from the battery 180 to the power conversion device 600, into three-phase AC power and then supply this power to stator windings that are armature windings of the respective rotating electric machines 200, 202. The power modules 610, 620 further convert the AC power induced in the stator windings of the rotating electric machines 200, 202, into DC form and then supply this DC power to the high-voltage battery 180.

As shown in FIG. 2, the power modules 610, 620 both include three-phase bridge circuits, in which series circuits corresponding to three phases are electrically connected in parallel between a positive electrode side and negative electrode side of the battery 180. Each of the series circuits includes power semiconductors 21 that constitute an upper arm, and power semiconductors 21 that constitute a lower arm, and the two sets of power semiconductors 21 are connected in series. The power modules 610 and 620 are substantially of the same circuit composition, as shown in FIG. 2, thus the power module 610 is representatively described in further detail below.

The present embodiment uses insulated-gate bipolar transistors (IGBTs) 21 as switching power semiconductor elements. Each IGBT 21 includes three electrodes, namely a collector electrode, an emitter electrode, and a gate electrode. A diode 38 is electrically connected between the collector electrode and emitter electrode of the IGBT 21. The diode 38 has a cathodic electrode and an anodic electrode, the cathodic electrode being electrically connected to the collector electrode of the IGBT 21 and the anodic electrode to the emitter electrode of the IGBT 21 so that a direction pointing from the emitter electrode of the IGBT 21 to the collector electrode is the forward direction.

The switching power semiconductor elements may be metal-oxide semiconductor field-effect transistors (MOSFETs). The MOSFETs each include a drain electrode, a source electrode, and a gate electrode. In a case of the MOSFETs, the diode 38 in FIG. 2 is unnecessary since a parasitic diode in which a direction pointing from the drain electrode to the source electrode is the forward direction is disposed between the source electrode and drain electrode of each MOSFET.

The source electrode of one IGBT 21 and the drain electrode of the IGBT 21 are electrically connected in series to constitute an arm of each phase. In the present embodiment, only one IGBT is shown for each phase with a set of upper and lower arms. In actuality, however, a plurality of IGBTs being electrically connected in parallel are provided because of a large control-current capacity. These IGBTs are described as one power semiconductor below to simplify the description.

In the example of FIG. 2, the upper and lower arms of each phase are constituted by three IGBTs each. The drain electrode of one IGBT 21 with the upper arm of each phase is electrically connected to the positive electrode side of the battery 180, and the source electrode of the IGBT 21 with the lower arm of each phase to the negative electrode side of the battery 180. A neutral point in each arm of the phase (i.e., a connection between the source electrode of the upper-arm IGBT and the drain electrode of the lower-arm IGBT) is electrically connected to the armature winding (stator winding) of the corresponding phase in the relevant rotating electric machine 200, 202.

The driving circuits 652, 656 each include a driver for controlling the corresponding inverter 610, 620, and generate a driving signal for the IGBTs 21, based on a control signal that has been output from the control circuit 648. The driving signal that the driving circuit 652, 656 has generated is output to the gate of each power semiconductor element in the corresponding power module 610, 620. In each of the driving circuits 652, 656, six integrated circuits are provided that each generate the driving signal to be supplied to the gates of the upper and lower arms of each phase, and the six integrated circuits are constructed as one block.

The control circuit 648 constitutes a control section of each power module 610, 620. The control circuit 648 is constituted by a microcomputer that computes control signals (control values) to turn on and off the plurality of switching power semiconductor elements. A torque command signal (torque command value) from a host control system, sensor outputs from the current sensors 660, 662, and sensor outputs from speed sensors mounted in the rotating electric machines 200, 202 are input to the control circuit 648. The control circuit 648 computes a control value from the input signals and then outputs a switching timing control signal to the driving circuits 652, 656.

The send/receive circuit 644 on the connector board 642, provided to electrically connect the power conversion device 600 and the external control system, sends/receives information to/from the external system via the communications line 174. The capacitor module 630, which makes up a smoothing circuit to suppress DC voltage changes arising from the switching operation of the IGBTs 21, is electrically connected in parallel to DC terminals of the first power module 610 and the second power module 620.

Figure 3:
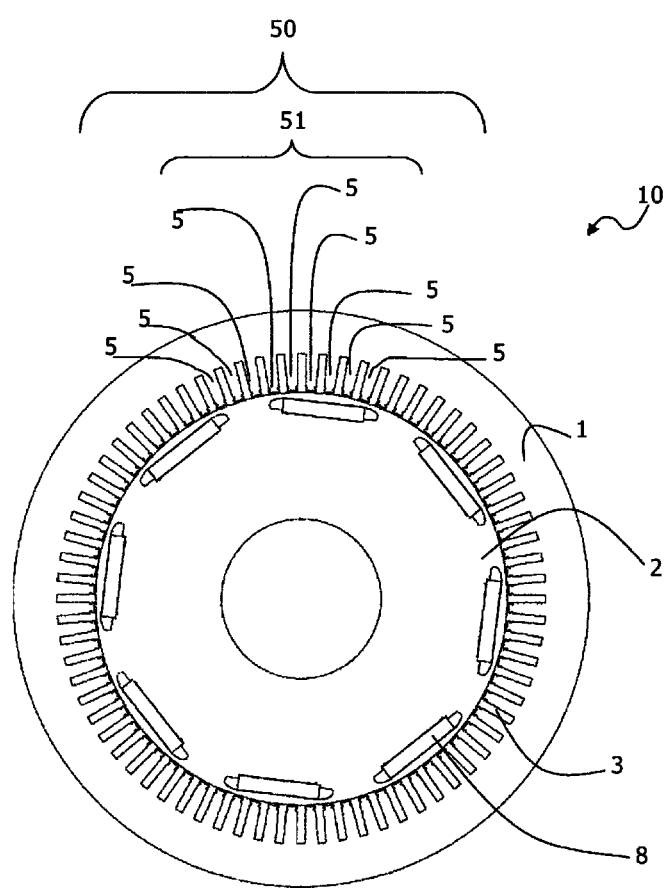
FIG. 3 is an external view showing an exemplary embodiment in which a rotating electric machine according to the present invention is applied to a permanent-magnet rotating electric machine, the permanent-magnet rotating electric machine having construction with a 72-slot stator core and eight poles.

FIG. 3 is a cross-sectional view showing schematically a permanent-magnet rotating electric machine, an example of a rotating electric machine according to the present invention. The permanent-magnet rotating electric machine 10 is used as the rotating electric machine 200 or 202 in the described hybrid automobile (see FIGS. 1, 2). As will be described hereunder, the configuration of the rotating electric machine according to the present invention can be applied to synchronous reluctance motors and induction motors as well as to permanent-magnet rotating electric machines.

The configuration characterizing the present invention is described below in accordance with embodiments referring to FIGS. 3 to 20.

First Embodiment

Figure 4:
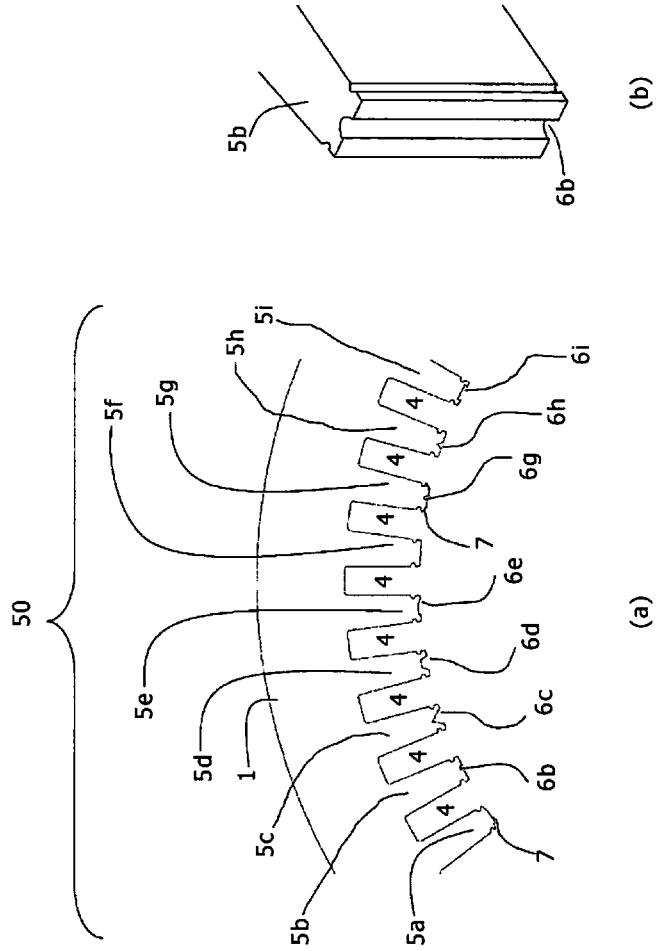
FIG. 4 is a diagram that shows a stator configuration common to a rotating electric machine according to a first embodiment and fifth embodiment of the present invention.

FIG. 3 shows a rotating electric machine according to a first embodiment of the present invention. The rotating electric machine shown in FIG. 3 is an example of application of the invention to a three-phase permanent-magnet rotating electric machine, which employs an 8-pole 72-slot structure. Teeth whose number is equal to "m" or "d" are taken as one group. Here, "m" (=9) is a quotient obtained by dividing the number of stator slots, S (=72), by the greatest common divisor N (=8) of the number of poles, P, and the number of stator slots, S, and "d" (=3) is an aliquot of "m". Each tooth in this group has a distal end of a different shape. FIG. 4 is a diagram showing an example of a tooth group of the three-phase permanent-magnet rotating electric machine shown in FIG. 3, and FIG. 4(a) shows an exemplary shape of the distal ends of the nine teeth, 5, which form one tooth group, 50. FIG. 4(b) is a diagram in which an axial shape of the teeth in FIG. 4(a) is shown taking a tooth 5b as an example. In FIG. 3, all stator teeth are shown with reference number 5 for the sake of illustrative simplicity. Permanent magnets 8 are also shown.

The teeth 5 in FIG. 3 are teeth 5a to 5i different from each other in the shape of the distal end, as shown in FIG. 4. A stator core 1 in FIG. 3 is formed by arranging eight groups periodically in a circumferential direction of the stator core, each of the eight groups containing the nine teeth 5a-5i that constitute a group 50 shown in FIG. 4. In addition, grooves formed at the distal ends of these teeth are shown as 6b to 6e and 6g to 6i. The different distal-end shapes are omitted in FIG. 3 and they are all shown simply as teeth 5. Furthermore, stator coils, wound around the slots 4 of the stator core 1 which forms part of the rotating electric machine 10, are also omitted.

Referring to FIG. 4, grooves 6b to 6e and 6h to 6i are provided respectively on six teeth, 5b to 5e and 5h, 5i, of the nine teeth, 5a to 5i, that constitute one group, 50. A taper 7 is provided on one tooth, 5a, and a groove 6g and a taper 7 are provided on one tooth, 5g. These grooves and tapers are present on a surface of the teeth that faces a rotor. Neither a groove 6 nor a taper 7 is provided on the tooth 5f.

The presence of the grooves and tapers on the teeth extends a magnetic average distance between the distal end of each stator tooth and the rotor surface, thereby allowing harmonics amplitude of a radial electromagnetic excitation force. Calculation results based on this configuration are shown with calculation results of other embodiments in FIGS. 9 to 11.

Second Embodiment

Figure 5:
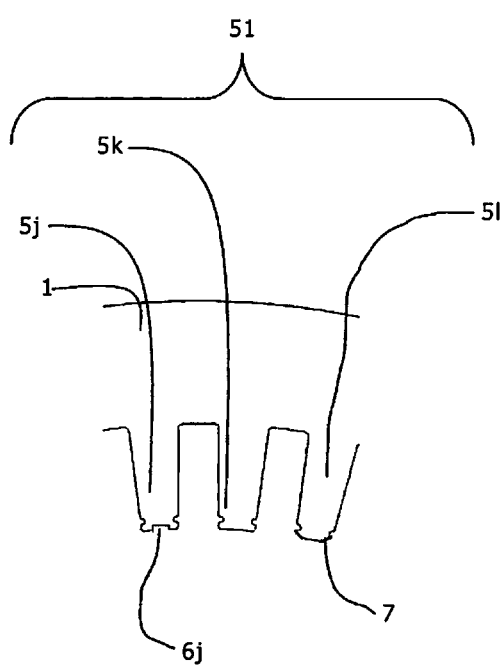
FIG. 5 is a diagram that shows a stator configuration common to a rotating electric machine according to a second embodiment and sixth embodiment of the present invention.

FIG. 5 shows a rotating electric machine according to a second embodiment of the present invention. Three stator teeth, 5j to 5l, constitute one tooth group, 5l. In the example of FIG. 5, the tooth 5j is formed with a groove 6j at its distal end and the tooth 5l is formed with a taper 7 at its distal end. The three stator teeth constitute one tooth group because 3 is an aliquot "d" of a quotient "m" obtained by dividing the number of stator slots, S, by the greatest common divisor N. All teeth of the stator can be formed by arranging 24 tooth groups 51, each of three teeth, periodically in a circumferential direction of the stator core. The effect of reducing the harmonics of a radial electromagnetic excitation force can also be obtained in the stator of the rotating electric machine employing the tooth groups of such a configuration. Calculation results based on this configuration are shown with calculation results of other embodiments in FIGS. 9 to 11.

Third Embodiment

Figure 6:
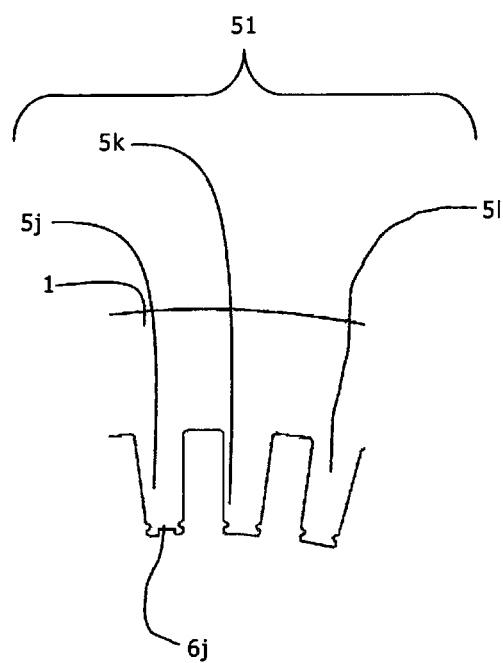
FIG. 6 is a diagram that shows a stator configuration common to a rotating electric machine according to a third embodiment and seventh embodiment of the present invention.

FIG. 6 shows a rotating electric machine according to a third embodiment of the present invention. Three stator teeth, 5j to 5l, constitute one tooth group, 51. In the example of FIG. 6, the tooth 5j is formed with a groove 6j at its distal end and the teeth 5k and 5l both have a flat non-dimensional shape at respective distal ends. The "flat" shape of the distal ends of the teeth in the present invention means that the shape includes part of a cylindrical surface having a radius of curvature of a circle whose radius is equal to a distance from the distal ends of the teeth to an axial center of the rotating electric machine. The "flat" shape of the distal ends of the teeth does not mean the flatness as used in a strict sense.

In addition, the three stator teeth constitute one tooth group because 3 is an aliquot "d" of a quotient "m" obtained by dividing the number of stator slots, S, by the greatest common divisor N. All teeth of the stator can be formed by arranging 24 tooth groups 5l, each of three teeth, periodically in a circumferential direction of the stator core.

The effect of reducing the harmonics of a radial electromagnetic excitation force can also be obtained in the stator of the rotating electric machine employing the tooth groups of such a configuration. Calculation results based on this configuration are shown with calculation results of other embodiments in FIGS. 9 to 11.

Fourth Embodiment

Figure 7:
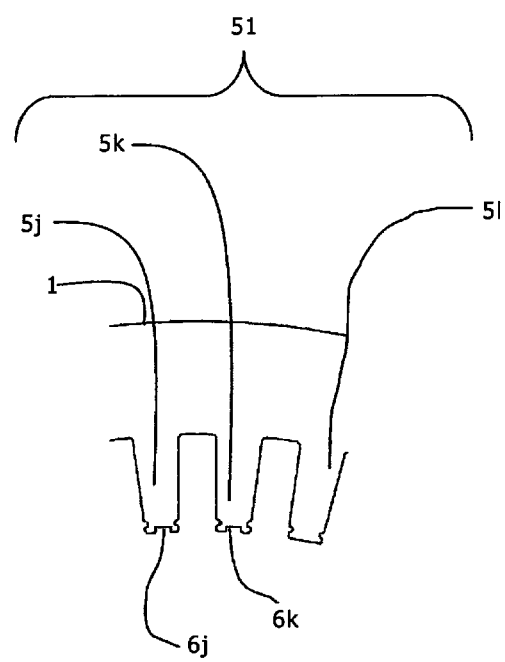
FIG. 7 is a diagram that shows a stator configuration common to a rotating electric machine according to a fourth embodiment and eighth embodiment of the present invention.

FIG. 7 shows a rotating electric machine according to a fourth embodiment of the present invention. Three stator teeth, 5j to 5l, constitute one tooth group, 5l. In the example of FIG. 7, the teeth 5j and 5k are respectively formed with grooves 6j and 6k of the same shape at their distal ends. The three stator teeth constitute one tooth group because 3 is an aliquot "d" of a quotient "m" obtained by dividing the number of stator slots, S, by the greatest common divisor N. All teeth of the stator can be formed by arranging 24 tooth groups 51, each of three teeth, periodically in a circumferential direction of the stator core.

The effect of reducing the harmonics of a radial electromagnetic excitation force can also be obtained in the stator of the rotating electric machine employing the tooth groups of such a configuration. Calculation results based on this configuration are shown with calculation results of other embodiments in FIGS. 9 to 11.

In any one of the rotating electric machines according to the first to fourth embodiments of the present invention, as shown in FIG. 4 or FIGS. 5 to 7, at least one tooth, 5, that forms part of one stator tooth group, 50 or 51, has a distal end of a shape different from that of distal ends of other teeth.

Figure 8:
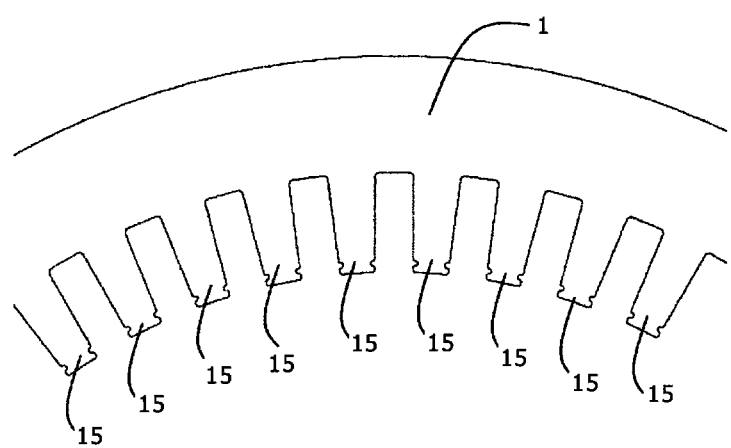
FIG. 8 is a diagram showing an example of a general stator tooth shape in a related technique, keyed to FIG. 4, for comparison with the present invention. The teeth in the related technique have the same shape at their distal ends.

FIG. 8 shows an example of a general stator tooth shape used in a related technique, and all teeth 15 in the related technique have a distal end of a flat shape.

The stator configurations of the rotating electric machines according to the first to fourth embodiments of the present invention, as with the stator configuration of FIG. 8 that relates to the rotating electric machine according to the related technique, enables harmonics amplitude of electromagnetic excitation force to be changed without changing a periodic boundary condition of ⅛ of a geometric shape formed by combining the teeth 5, the rotor core 2, and the magnets 8.

(Reduction Effect for the Harmonics of Electromagnetic Excitation Forces in the Rotating Electric Machines According to the Present Invention)

Figure 9:
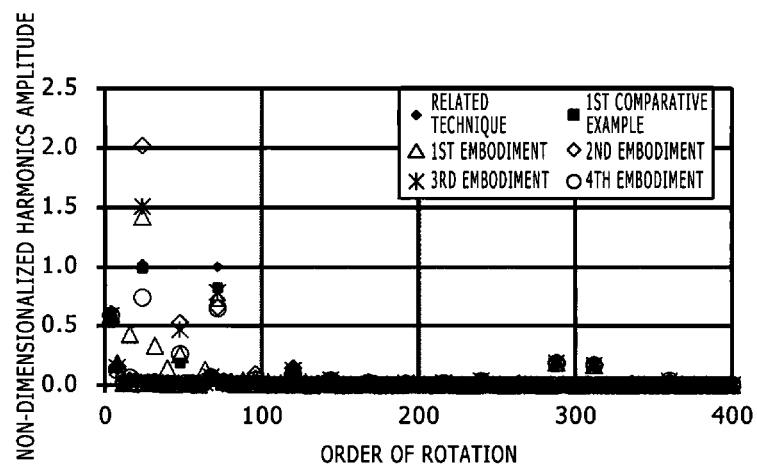
FIG. 9 is a diagram showing calculation results on harmonics of a radially spatial 0th-order electromagnetic excitation force in a case of using a permanent-magnet rotating electric machine as a rotating electric machine. The first to fourth embodiments of the present invention, the related technique, and a first comparative example are compared with respect to the tooth shape of the rotating electric machine.
Figure 10:
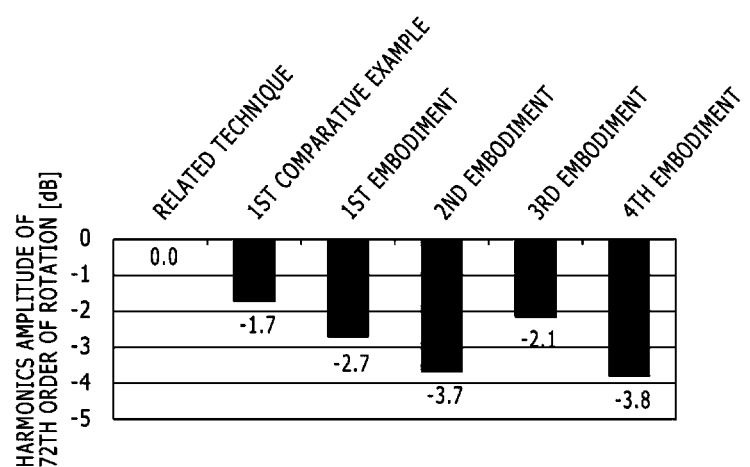
FIG. 10 is a diagram in which the calculation results corresponding to a 72nd order of rotation in FIG. 9 are represented in dB with the calculation results of the related technique (♦) taken as a reference.
Figure 11:
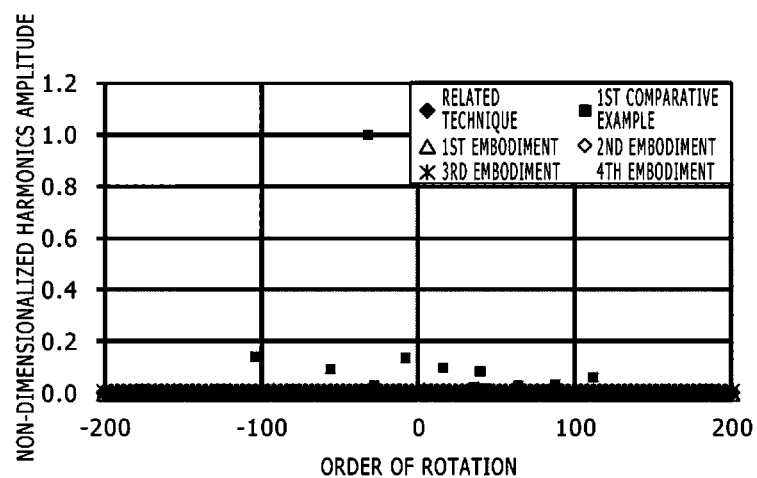
FIG. 11 is a diagram showing calculation results on harmonics of a radially spatial 4th-order electromagnetic excitation force in a case of using a permanent-magnet rotating electric machine as a rotating electric machine. The first to fourth embodiments of the present invention, the related technique, and the first comparative example are compared with respect to the tooth shape of the rotating electric machine.

For the sake of comparison, FIGS. 9 to 11 show calculation results on the harmonics of electromagnetic excitation forces in the respective stator configurations based on the first to fourth embodiments of the present invention, on the related technique shown in FIG. 8, and on a first comparative example.

The stator configuration in the first comparative example employs, of all configurational conditions relating to the rotating electric machine shown in Patent Document 1, only a structural condition of constituting one group with two teeth, 5, and providing on each alternate tooth a groove substantially equivalent to the groove 6e of FIG. 4.

The rotating electric machine described in Patent Document 1 is a permanent-magnet rotating electric machine having a "2n×s" number of slots in the stator core with "n" poles and "s" phases. The periodic boundary condition of the geometric shape formed by combining the teeth 5, the rotor core 2, and the magnets 8 is ⅛ in eight-pole machine specifications. The rotating electric machine in FIG. 3 is a permanent-magnet rotating electric machine with a "3n×s" number of slots in the stator core, and if the stator configuration in the first comparative example is used, this results in a periodic boundary condition different from the above, that is, the geometric shape formed by combining the teeth 5, the rotor core 2, and the magnets 8 becomes ¼.

The fact that the configuration of the rotating electric machine according to any one of the first to fourth embodiments of the present invention is also effective, where the combination condition including the number of poles and stator core slots is different from that in Patent 1, will be described below using the first comparative example.

It is known that if an excitation frequency of harmonics of a radially spatial 0th-order electromagnetic excitation force agrees with a natural frequency of an annular 0th-order mode of the stator, then this causes vibration/noise due to resonance of the stator. This natural frequency differs according to a particular physique (kind and construction) of the rotating electric machine, but tends to become high in compact rotating electric machines. This is described below assuming that the natural frequency at which the stator of the permanent-magnet rotating electric machine becomes deformed in the annular 0th-order mode is about 7.5 kHz.

FIG. 9 shows analytical calculation results on harmonics amplitude of radially spatial 0th-order electromagnetic excitation forces in the first to fourth embodiments and in the related technique and the first comparative example. The harmonics amplitude of the radially spatial 0th-order electromagnetic excitation forces in FIG. 9 is made dimensionless on the basis of the harmonics amplitude of a 72nd order of rotation in the related technique.

If the rotating electric machine rotates at a speed of $R_N$ (r/min) and the harmonics of the electromagnetic excitation force has a rotation order of "k", the excitation frequency "f" (Hz) is represented by expression (1).

$$f=(R_N/60)\times k \qquad (1)$$

Therefore, if a maximum permissible rotational speed is 7,500 r/min, for example, vibration/noise arises from resonance between the harmonics components of the radially spatial 0th-order electromagnetic excitation forces of at least a 60th order of rotation (k≥60) and the annular 0th-order mode of the stator.

In consideration of this condition, the calculation results in FIG. 9 suggest that vibration/noise of maximum amplitude arises from the resonance between the harmonics component of a radially spatial 0th-order electromagnetic excitation force of the 72nd order of rotation and the annular 0th-order mode of the stator.

In FIG. 10, the calculation results in FIG. 9 that correspond to the amplitude of the 72nd order of rotation components in the harmonics of electromagnetic excitation forces are represented in decibels (dB) with the calculation results of the related technique taken as a reference.

By comparison, the results are −1.7 dB in the first comparative example, −2.7 dB in the first embodiment, −3.7 dB in the second embodiment, −2.1 dB in the third embodiment, and −3.8 dB in the fourth embodiment. These results indicate, therefore, that using the stator configuration of the rotating electric machine according to any one of the first to fourth embodiments of the present invention enables the harmonics amplitude of the electromagnetic excitation force to be reduced relative to a level observed during the use of the stator configuration of a general tooth shape in the related technique, and a level observed during the use of the stator configuration based on the first comparative example. This means that in the rotating electric machine according to any one of the first to fourth embodiments of the present invention, vibration/noise due to the harmonics of the radially spatial 0th-order electromagnetic excitation forces can be reduced more significantly than in the rotating electric machines based on the related technique and the first comparative example.

The number of slots in the rotating electric machine to which the first comparative example is to be originally applied is 48 for 8-pole machine specifications. Since this is ignored and the groove 6 is provided at the distal end of each alternate tooth, harmonics of a radially spatial 4th-order (mechanical-angle) electromagnetic excitation force not present in other stator configurations does occur in the first comparative example. The harmonics of the radially spatial 4th-order electromagnetic excitation force, however, does not occur in the stator configurations of the first to fourth embodiments or in the stator configuration of the general rotating electric machine whose stator teeth have the distal ends of the same shape (see FIG. 8).

FIG. 11 shows calculation results on the harmonics of the radially spatial 4th-order electromagnetic excitation force. The harmonics amplitude of the electromagnetic excitation force in FIG. 11 is made dimensionless on the basis of the harmonics amplitude of a −32nd order of rotation in the first comparative example.

Referring to FIG. 11, the harmonics of the radially spatial 4th-order electromagnetic excitation force only exists in the first comparative example. A vibration/noise peak due to resonance with the annular 4th-order mode of the stator is therefore likely to occur in the first comparative example.

In the rotating electric machine according to any one of the first to fourth embodiments of the present invention, as in the general rotating electric machine (see FIG. 8) that includes the stator teeth of the same distal-end shape in the related technique, vibration/noise can be reduced since the radially spatial 4th-order harmonics does not occur and since the harmonics amplitude of the radially spatial 0th-order electromagnetic excitation force can be reduced relative to that of the rotating electric machine based on the related technique.

The examples (the first to fourth embodiments of the present invention) in which the stator structure of a rotating electric machine according to the invention is applied to the permanent-magnet rotating electric machine shown in FIG. 3 have been described above. The following describes examples (fifth to eighth embodiments of the present invention) in which the stator structure of the rotating electric machine according to one of the first to fourth embodiments of the invention is applied to a three-phase synchronous reluctance motor.

Fifth Embodiment

Figure 12:
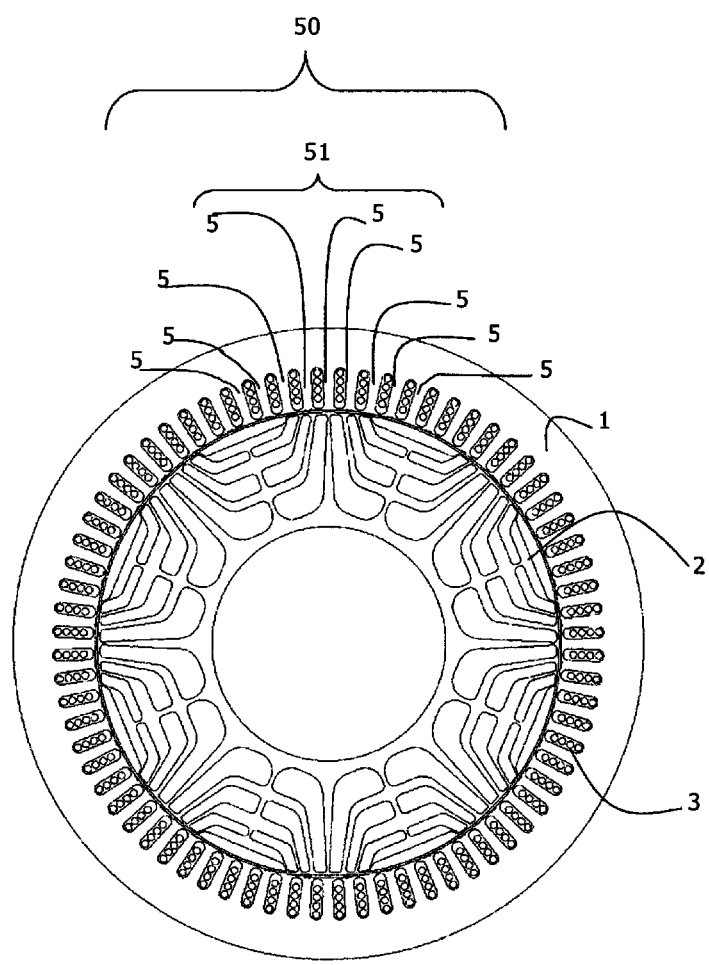
FIG. 12 is a diagram showing an exemplary embodiment in which a rotating electric machine according to the present invention is applied to a synchronous reluctance motor, the synchronous reluctance motor having construction with a 72-slot stator core and eight poles.

FIG. 12 shows a rotating electric machine according to a fifth embodiment of the present invention. The rotating electric machine shown in FIG. 12 is an example of application of the invention to a three-phase synchronous reluctance motor, wherein the number of poles, P, is 8, the number of stator slots, S, is 72, and the greatest common divisor N is 8.

In the rotating electric machine of FIG. 12, the stator and the stator teeth also are substantially of the same configuration as that used in the permanent-magnet rotating electric machine of FIG. 3, that is, the rotating electric machine has the configuration according to any one of the first to fourth embodiments. For simplicity, the stator teeth are all shown with reference number 5 in FIG. 12. Stator coils 3 are also shown.

In the fifth embodiment, as in the first embodiment, the number of teeth 5 constituting one stator tooth group 50 is 9, a quotient "m" obtained by dividing the number of stator slots, S, by the greatest common divisor N, and the grooves 6b-6e, 6g-6i and tapers 7 as shown in FIG. 4 are provided. The stator core 1 shown in FIG. 12 is formed by arranging eight groups periodically in a circumferential direction of the stator core, each of the eight groups containing the nine teeth 5a-5i that constitute one group, 50, shown in FIG. 4. Calculation results on the harmonics of electromagnetic excitation force in this stator configuration are shown with calculation results of other embodiments in FIGS. 13 to 15.

Sixth Embodiment

In a sixth embodiment, as in the second embodiment, the number of teeth 5 constituting one stator tooth group 51 is 3 (5j-5l), a quotient "m" obtained by dividing the number of stator slots, S, by the greatest common divisor N, and a groove 6j and a taper 7 are provided as shown in FIG. 5. The stator core 1 shown in FIG. 12 is formed by arranging 24 groups periodically in a circumferential direction of the stator core, each of the 24 groups containing the teeth 5 that constitute one group, 51, shown in FIG. 5. Calculation results on the harmonics of electromagnetic excitation force in this stator configuration are shown with calculation results of other embodiments in FIGS. 13 to 15.

Seventh Embodiment

In a seventh embodiment, as in the third embodiment, the number of teeth 5 constituting one stator tooth group 51 is 3 (5j-5l), a quotient "m" obtained by dividing the number of stator slots, S, by the greatest common divisor N, and as shown in FIG. 6, a groove 6j is provided at a distal end of the tooth 5j. The stator core 1 shown in FIG. 12 is formed by arranging 24 groups periodically in a circumferential direction of the stator core, each of the 24 groups containing the teeth 5 that constitute one group, 51, shown in FIG. 5. Calculation results on the harmonics of electromagnetic excitation force in this stator configuration are shown with calculation results of other embodiments in FIGS. 13 to 15.

Eighth Embodiment

In an eighth embodiment, as in the fourth embodiment, the number of teeth 5 constituting one stator tooth group 51 is 3 (5j-5l), a quotient "m" obtained by dividing the number of stator slots, S, by the greatest common divisor N, and as shown in FIG. 7, grooves 6j, 6k of the same shape are provided at distal ends of the teeth 5j, 5k. The stator core 1 shown in FIG. 12 is formed by arranging 24 groups periodically in a circumferential direction of the stator core, each of the 24 groups containing the teeth 5 that constitute one group, 51, shown in FIG. 7. Calculation results on the harmonics of electromagnetic excitation force in this stator configuration are shown with calculation results of other embodiments in FIGS. 13 to 15.

In the rotating electric machines according to the fifth to eighth embodiments, as in the first to fourth embodiments, at least one tooth that forms part of one stator tooth group, 50 (in the fifth embodiment) or 51 (in the sixth, seventh, or eighth embodiments), has a distal end of a shape different from that of distal ends of other teeth.

Thus the stator configurations of the rotating electric machines according to the fifth to eighth embodiments of the present invention, as with the stator configuration of FIG. 8 that relates to the rotating electric machine according to the related technique, enables the harmonics amplitude of electromagnetic excitation force to be changed without changing a periodic boundary condition of ⅛ of a geometric shape formed by combining the teeth 5 and the rotor core 2.

Figure 13:
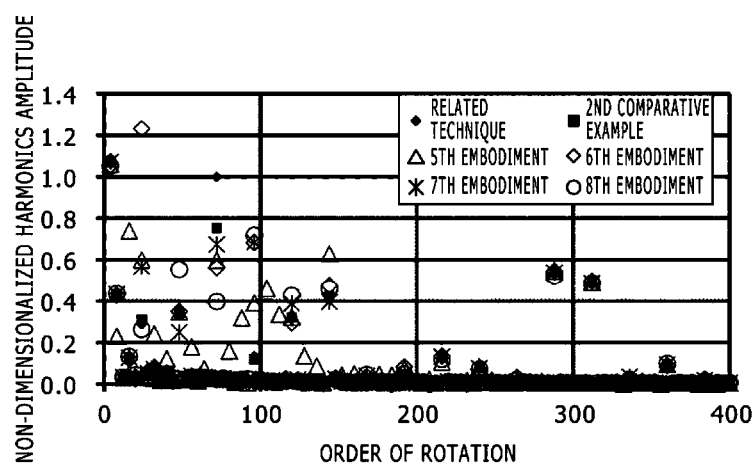
FIG. 13 is a diagram showing calculation results on harmonics of a radially spatial 0th-order electromagnetic excitation force in an example of applying the stator structure of the rotating electric machine (in one of the firth to fourth embodiments of the present invention) to the synchronous reluctance motor of FIG. 12. The fifth to eighth embodiments of the invention, the related technique, and a second comparative example are compared with respect to the tooth shape of the rotating electric machine.
Figure 14:
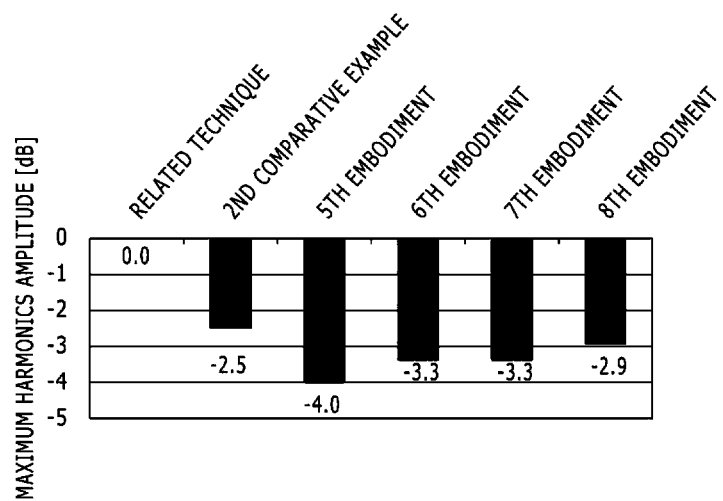
FIG. 14 is a diagram in which a part of the calculation results in FIG. 13 is represented in dB with the calculation results of the related technique (♦) taken as a reference, the part of the calculation results being maximum harmonics amplitude of spatial electromagnetic excitation forces of at least a 60th order of rotation in the related technique, the second comparative example, and the fifth to eighth embodiments of the present invention.
Figure 15:
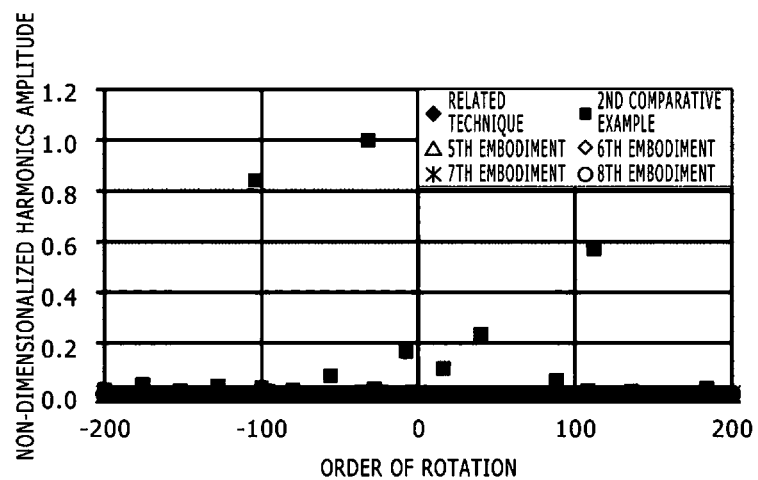
FIG. 15 is a diagram showing calculation results on harmonics of a radially spatial 4th-order electromagnetic excitation force in a case of using a synchronous reluctance motor as a rotating electric machine. The fifth to eighth embodiments of the present invention, the related technique, and the second comparative example are compared with respect to the tooth shape of the rotating electric machine.

For the sake of comparison, FIGS. 13 to 15 show calculation results on the harmonics of electromagnetic excitation forces in the respective stator configurations according to the fifth to eighth embodiments, the related technique shown in FIG. 8, and a second comparative example.

The stator configuration in the second comparative example employs, substantially of all the configurational conditions relating to the rotating electric machine shown in Patent Document 1, only the structural condition of constituting one group with two teeth, 5, and providing on each alternate tooth a groove substantially equivalent to the groove 6e of FIG. 4.

The periodic boundary condition of the geometric shape formed by combining the teeth 5 and the rotor core 2 becomes ¼ if the second comparative example is applied to the rotating electric machine of FIG. 12. The fact that the configuration of the rotating electric machine according to any one of the fifth to eighth embodiments of the present invention is also effective, where the combination condition including the number of poles and stator core slots is different from that in Patent 1, will be described below using the second comparative example.

FIG. 13 shows analytical calculation results on harmonics amplitude of radially spatial 0th-order electromagnetic excitation forces in the fifth to eighth embodiments and in the related technique and the second comparative example. As in a case of FIG. 9, the harmonics amplitude of the radially spatial 0th-order electromagnetic excitation forces in FIG. 13 is made dimensionless on the basis of the harmonics amplitude of the 72nd order of rotation in the related technique.

As described above, if the excitation frequency of the harmonics of the radially spatial 0th-order electromagnetic excitation force agrees with a natural frequency of an annular 0th-order mode of the stator, then this causes a vibration/noise peak due to resonance of the stator. If it is assumed that the natural frequency at which the stator of this synchronous reluctance motor becomes deformed in the annular 0th-order mode is about 7.5 kHz and that a maximum permissible rotational speed is 7,500 r/min, the vibration/noise peak arises from the resonance between the harmonics components of the radially spatial 0th-order electromagnetic excitation forces of at least the 60th order of rotation and the annular 0th-order mode of the stator.

FIG. 14 is a decibel (dB) representation of the amplitude of the 60th and higher orders of rotation components in the harmonics of electromagnetic excitation forces, shown in FIG. 13.

Referring to FIG. 14, by comparison, maximum amplitude of the 72th order of rotation in the second comparative example is −2.5 dB, that of a 144th order of rotation in the fifth embodiment is −4.0 dB, that of a 96th order of rotation in the sixth embodiment is −3.3 dB, that of the 96th order of rotation in the seventh embodiment is −3.3 dB, and that of the 96th order of rotation in the eighth embodiment is −2.9 dB. Briefly, these results indicate that the maximum amplitude can be reduced below an amplitude level of the 72th order of rotation in the related technique. When the rotating electric machine according to any one of the fifth to eighth embodiments of the present invention is applied to a synchronous reluctance motor, therefore, vibration/noise due to the harmonics of the radially spatial 0th-order electromagnetic excitation force can be reduced relative to the vibration/noise levels observed in the rotating electric machines based on the related technique and the second comparative example.

FIG. 15 shows calculation results on the harmonics of the radially spatial 4th-order electromagnetic excitation force. The harmonics amplitude of the electromagnetic excitation force in FIG. 15 is made dimensionless on the basis of the harmonics amplitude of the −32nd order of rotation in the second comparative example.

The number of slots in the rotating electric machine to which the second comparative example is to be originally applied is 48 for 8-pole machine specifications. Since this is ignored and the groove 6 is provided at the distal end of each alternate tooth, the harmonics of the radially spatial 4th-order electromagnetic excitation force not present in other stator configurations does occur in the second comparative example. The vibration/noise peak due to the resonance with the annular 4th-order mode of the stator is therefore likely to occur in the second comparative example.

In the rotating electric machine according to any one of the fifth to eighth embodiments of the present invention, as in the general rotating electric machine (see FIG. 8) that includes the stator teeth of the same distal-end shape in the related technique, vibration/noise can be reduced since the radially spatial 4th-order harmonics does not occur and since the harmonics amplitude of the radially spatial 0th-order electromagnetic excitation force can be reduced relative to that of the rotating electric machine based on the related technique.

Ninth Embodiment

Figure 16:
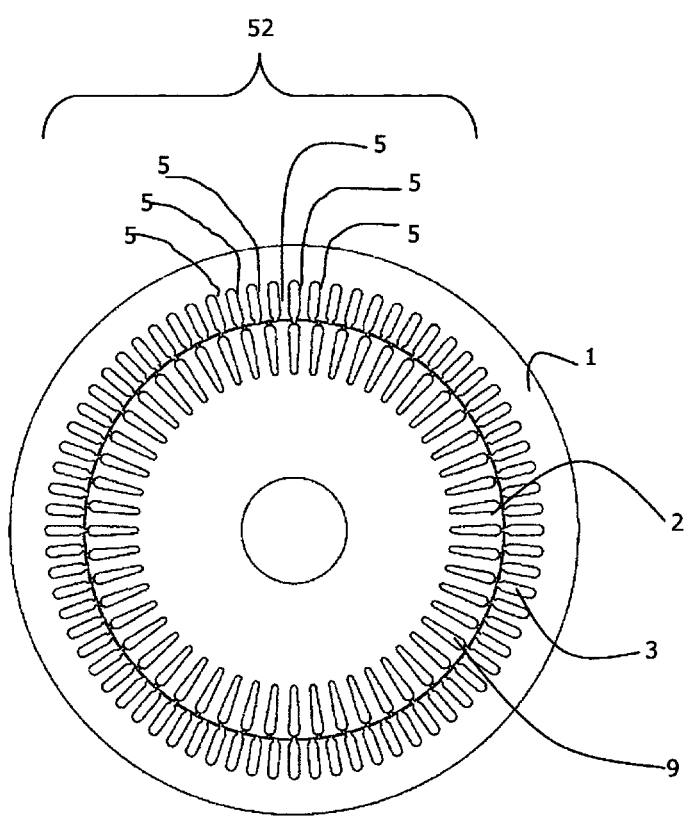
FIG. 16 is a diagram showing an exemplary embodiment in which a rotating electric machine according to the present invention is applied to an induction motor, the induction motor having construction with a 72-slot stator core, 52-slot rotor core, and eight poles.

FIG. 16 shows a rotating electric machine according to a ninth embodiment of the present invention, the embodiment being an example of application of the rotating electric machine to a three-phase AC induction motor. This induction motor includes a conductor 9 in its rotor 2. For simplicity, all stator teeth are shown with reference number 5 in FIG. 16.

In this three-phase AC induction motor, the number of poles, P, is 8, that of stator slots, S, is 72, that of rotor slots, R, is 52, and the greatest common divisor N is 4. The greatest common divisor N in the induction motor is the greatest common divisor of the number of poles, P, the number of stator slots, S, and the number of rotor slots, R. A quotient "m" obtained by dividing the number of stator slots, S, by the greatest common divisor N is 18.

Figure 17:
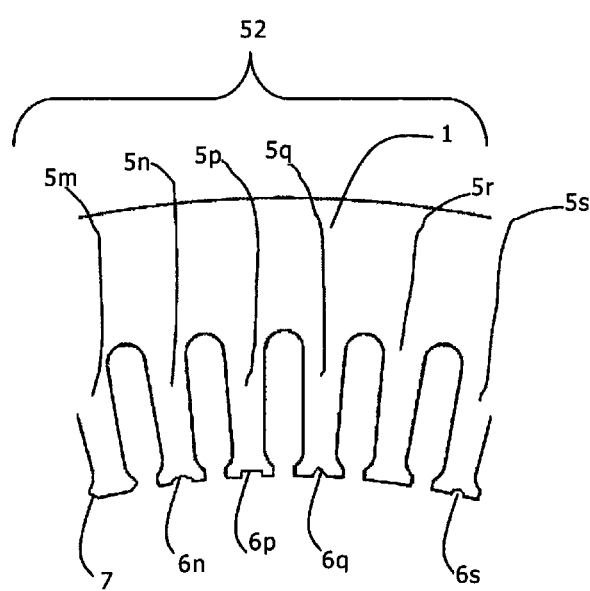
FIG. 17 is a diagram showing a shape of teeth which form one tooth group of a stator in a rotating electric machine according to a ninth embodiment of the present invention, the stator being used in the induction motor shown in FIG. 16.

The number of teeth 5 constituting one stator tooth group 52 is 6, an aliquot "d" of 18. As shown in FIG. 17, the teeth 5m to 5s are each provided with a taper 7 and are provided with grooves 6n to 6q, 6s, respectively. The stator core 1 shown in FIG. 16 is formed by arranging 12 groups periodically in a circumferential direction of the stator core, each of the 12 groups containing the teeth 5m to 5s that constitute one group, 52, shown in FIG. 17.

Figure 19:
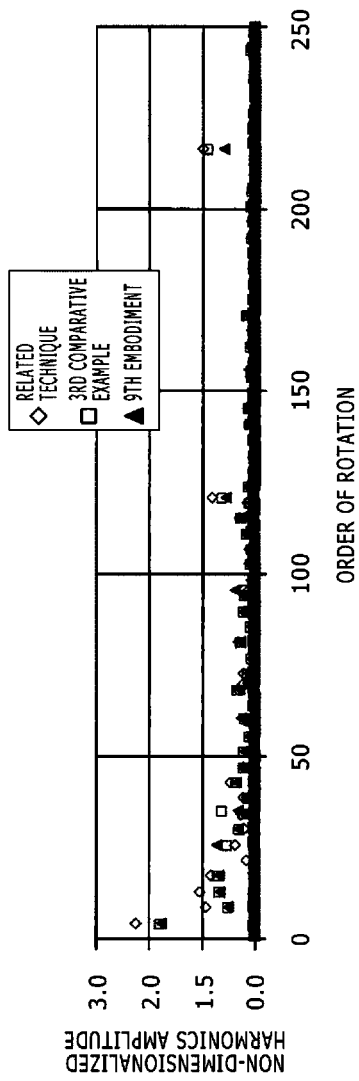
FIG. 19 is a diagram showing calculation results on harmonics of a radially spatial 0th-order electromagnetic excitation force in a case of using the induction motor of FIG. 16 as a rotating electric machine. The ninth embodiment of the present invention, the related technique, and a third comparative example are compared with respect to the tooth shape of the rotating electric machine.
Figure 20:
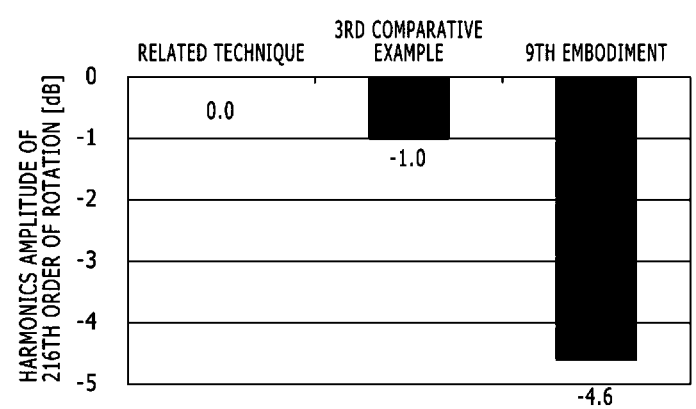
FIG. 20 is a diagram in which the calculation results corresponding to a 216th order of rotation in FIG. 19 are represented in dB with the calculation results of the related technique (◇) taken as a reference.

Calculation results on the harmonics of electromagnetic excitation force in this stator configuration are shown in FIGS. 19 and 20, along with calculation results relating to the stator configurations of the related technique and a third comparative example.

The third comparative example, as with the first and second comparative examples, employs the tooth shape described in Patent Document 1, that is, the tooth shape in which one stator tooth group is constituted by two teeth and each alternate tooth includes a groove substantially equivalent to the groove 6e.

The teeth 5m-5s constituting one stator tooth group, 52, are formed so as to differ from each other in a shape of a distal end. Thus the stator teeth of the rotating electric machine according to the present embodiment of the present invention, as with stator teeth 15 of FIG. 18 that relate to a rotating electric machine according to the related technique, enables the harmonics of the electromagnetic excitation force to be changed without changing the periodic boundary condition of ¼ of the geometric shape formed by combining the teeth 5 and a rotor core 2.

Figure 18:
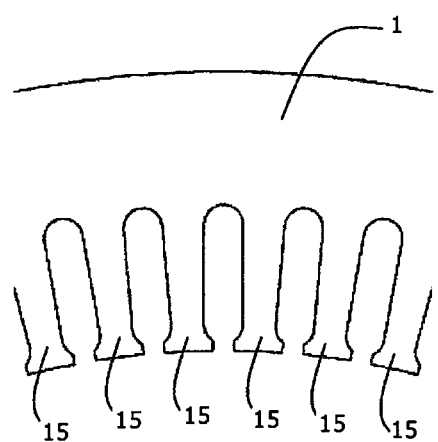
FIG. 18 is a diagram showing an example of a stator tooth shape generally used in the related technique.

For the sake of comparison, FIGS. 19 and 20 show calculation results relating to the stator configurations according to the ninth embodiment, the related technique shown in FIG. 18, and the third comparative example.

FIGS. 19, 20 show analytical calculation results on harmonics amplitude of radially spatial 0th-order electromagnetic excitation forces in the respective stator configurations according to the ninth embodiment, the related technique, and the third comparative example. The harmonics amplitude of the radially spatial 0th-order electromagnetic excitation forces in FIGS. 19, 20 is made dimensionless on the basis of harmonics amplitude of a 216th order of rotation in the stator configuration based on the related technique.

The general stator of the induction motor according to the related technique includes teeth having distal ends of the same shape, and noise measurements based on rotation tests have already shown that the harmonics component of the 216th order of rotation stands out. Accordingly, harmonics amplitude of the electromagnetic excitation force in the 0th order of rotation was first compared between the three cases. The results in FIGS. 19, 20 indicate that by comparison, the harmonics amplitude of the 0th order of rotation is improved by −1.0 dB in the third comparative example and −4.6 dB in the ninth embodiment, over that of the stator configuration in the related technique. This means that in terms of vibration/noise reduction the ninth embodiment is more effective than the related technique and the third comparative example. FIG. 19 indicates that harmonics amplitude of other orders of rotation in the ninth embodiment also tends to be reduced more effectively than in the related technique and the third comparative example.

It can be appreciated from the above that even in a configuration departing from the application condition described in Patent Document 1, that is, the condition of "2n×3" in the number of stator core slots in machine specifications of "n" poles and "s" phases, the present invention is effective for reducing the harmonics of radial electromagnetic excitation force and hence for reducing vibration/noise.

The above also indicates that the invention can be applied to induction motors as well.

The embodiments of the present invention that have been described above are only examples and the invention is not limited to/by the embodiments. In other words, the invention is not limited to the number of phases, poles, stator slots, or rotor slots used in the rotating electric machines of the embodiments.

The first and fifth embodiments have employed an arrangement of nine teeth in one group, and the second to fourth embodiments and the sixth to eight embodiments have employed an arrangement of three teeth in one group. While in these embodiments the permanent-magnet rotating electric machine or synchronous reluctance motor of the 8-pole 72-slot configuration has been described as an example, the present invention is not limited to the 8-pole 72-slot configuration. More specifically, the rotating electric machine in accordance with any one of the embodiments of the present invention includes a stator having a P number of phases and an S number of teeth, and a rotor disposed in the stator with a gap intervening between the stator and the rotor. The teeth of the stator are grouped in units of the number of teeth that is equal to a value "m" or a value "d", the value "m" being obtained by dividing the number of stator slots, S, by the greatest common divisor N of the number of poles, P, and the number of stator slots, S, the value "d" being an aliquot of "m". The stator configuration can be applied to a variety of rotating electric machines in which at least one tooth in each of stator tooth groups which have been formed similarly to the above has a distal end different in shape from distal ends of other teeth belonging to the same tooth group.

In addition, the ninth embodiment relating to an induction motor has employed an arrangement of six teeth in one group.

While the ninth embodiment has been described taking the 8-pole 72-slot configuration as an example, the present invention is not limited to the 8-pole 72-slot configuration. More specifically, the rotating electric machine in accordance with any one of the embodiments of the present invention includes a stator having a P number of phases and an S number of teeth, and a rotor disposed in the stator with a gap intervening between the stator and the rotor and having an R number of slots. The teeth of the stator are grouped in units of the number of teeth that is equal to a value "m" or a value "d", the value "m" being obtained by dividing the number of stator slots, S, by the greatest common divisor N of the number of poles, P, the number of stator slots, S, and the number of rotor slots, R, the value "d" being an aliquot of "m". The stator configuration can be applied to various induction motors in which a plurality of individual stator teeth in one of tooth groups which have been formed similarly to the above have distal ends of a shape different from that of distal ends of the other teeth in the group.

As described above, in the rotating electric machine according to any one of the embodiments of the present invention, at least one tooth of the grouped stator teeth has a distal end different in shape from distal ends of other teeth in the same group. This distal end, formed different in shape from distal ends of other teeth, has either a grooved shape, a tapered shape, a grooved and tapered shape, or a flat shape without a groove.

In addition, the groove formed at the distal end of the stator tooth is either flat-shaped, V-shaped, or dish-shaped, and the groove has its width and depth set allowing for gap length defined in terms of a magnetic average distance from the distal end of the stator tooth that includes the flat shape, to the rotor surface.

The grooved shape here means such a shape that, as denoted by reference number 6b in FIG. 4(*b*), includes a succession of various axial recesses formed at the distal ends of the stator teeth.

The grooves that have been used in the embodiments and the comparative examples are provided so as to measure, with the above gap length as a reference, a maximum of 1.0 in radial average depth and a minimum of 0.5 in circumferential length of an opening of the groove (i.e., in width of the groove). In addition, the circumferential length of the opening of the groove is equal to or less than ⅓ of circumferential length of the flat distal end of a tooth.

The above embodiments and modifications of the present invention have been described by way of example and the invention is not limited to/by these embodiments and modifications. Any person skilled in the art can implement various modifications without degrading any features or characteristics of the present invention. Notably in the present invention, a variety of rotating electric machines can be provided that each include a stator having tooth groups formed by combining stator tooth distal ends of the various shapes described in the first to ninth embodiments.

DESCRIPTION OF REFERENCE NUMBERS

1: Stator core
2: Rotor core
3: Stator coil
4: Stator slot
5, 5a-51, 15: Stator teeth
6b-6e, 6g-6j: Tooth grooves
7: Tooth taper
8: Permanent magnet
9: Conductor
15: Conventional general stator tooth
21: Power semiconductor
38: Diode
50, 51, 52: One stator tooth group
100: Vehicle
110: Front wheel
120: Engine
124: Engine control unit
130: Transmission
134: Transmission control unit
132: Differential gear
170: Integrated control system
174: Communications line
180: Battery
184: Battery control unit
200, 202: Rotating electric machines
600: Power conversion device
610, 620: Power modules
630: Capacitor module
642: Connector board
644: Send/receive circuit
646: Control circuit board
648: Control circuit
652: First driving circuit
650: Driving circuit board
654: Driving circuit board
656: Second driving circuit
660: Current sensor
662: Current sensor

The invention claimed is:

1. A rotating electric machine, comprising:
a stator having an S number of teeth; and
a rotor disposed in the stator with a gap intervening between the stator and the rotor, wherein:
the S number of teeth in the stator include a plurality of tooth groups formed in units of the number of teeth G represented by the following formula using the number of poles "P", the number of phases "s", and the number of the groups "A": $G=(3P\times s)/A$; and
at least one tooth in each of the tooth groups has a distal end different in shape from distal ends of other teeth belonging to the same tooth group, the plurality of tooth groups having the same configuration.

2. The rotating electric machine according to claim 1, wherein:
the distal end, formed to the at least one tooth and shaped differently from distal ends of other teeth belonging to the same tooth group, has a grooved or tapered shape or a flat shape.

3. The rotating electric machine according to claim 2, wherein:
the groove has either a flat shape, a V-shape, or a dish-shape;
average depth of the groove is equal to or less than gap length defined in terms of a magnetic average distance from the flat distal end of the tooth to the rotor surface; and
width of the groove is at least ½ of the gap length and is equal to or less than ⅓ of circumferential length of the flat distal end of the tooth.

4. The rotating electric machine according to claim 1, wherein:
the rotating electric machine is an induction motor and the S number of teeth in the stator are grouped in units of the number of teeth that is equal to a value "m" or a value "d", the value "m" being obtained by dividing the number of stator slots, S, by the greatest common divisor N of the number of poles, P, the number of stator slots, S, and the number of rotor slots, R, the value "d" being an aliquot of "m".

5. An electrically driven vehicle, comprising the rotating electric machine according to claim 1.

* * * * *